UNITED STATES PATENT OFFICE.

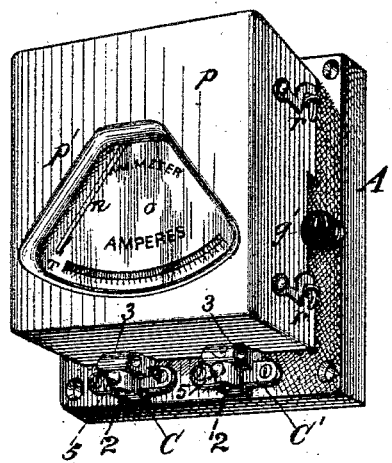
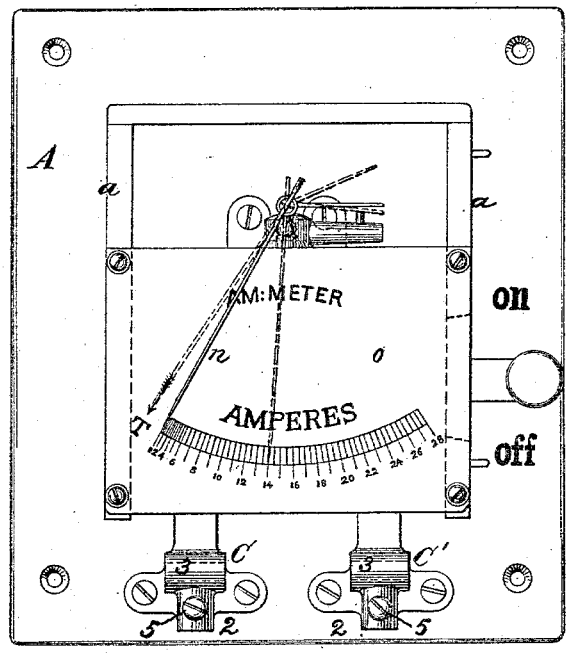
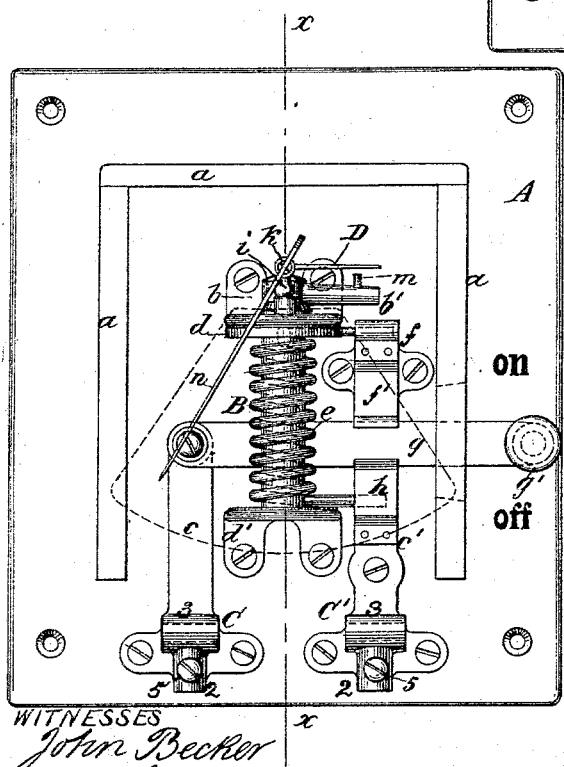
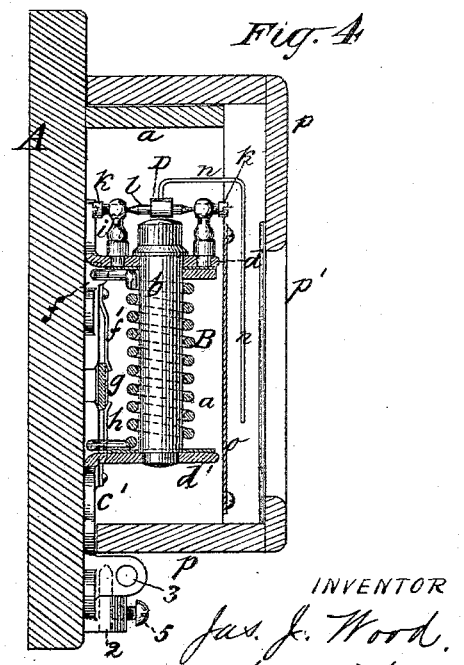

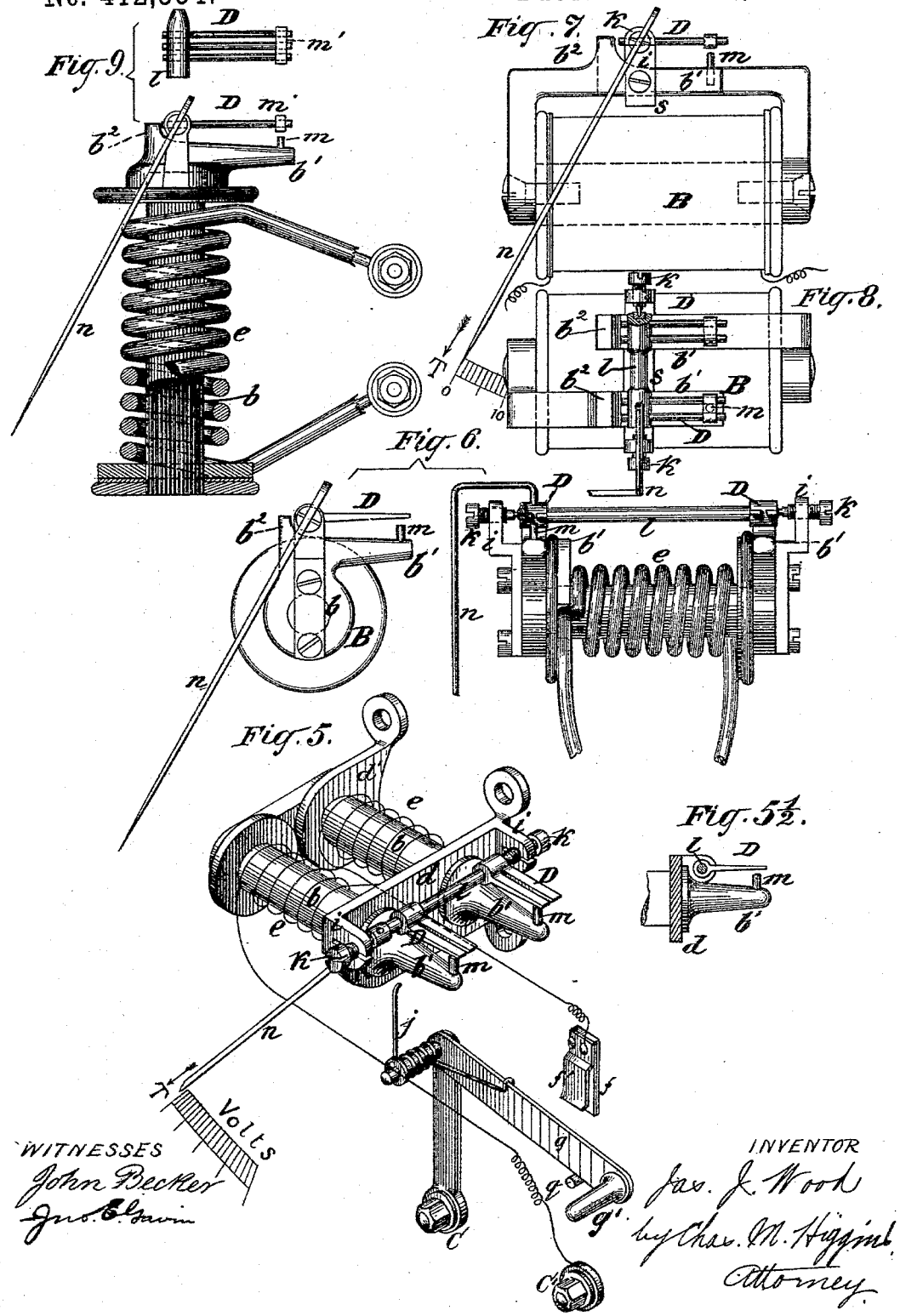

JAMES J. WOOD, OF BROOKLYN, NEW YORK.

ELECTRIC-CURRENT INDICATOR.

SPECIFICATION forming part of Letters Patent No. 412,354, dated October 8, 1889.

Application filed April 20, 1887. Serial No. 235,454. (No model.)

*To all whom it may concern:*

Be it known that I, JAMES J. WOOD, of Brooklyn, Kings county, New York, have invented certain new and useful Improvements in Electric Voltmeters, Ammeters, and Similar Electric or Magnetic Indicators, of which the following is a specification.

My invention aims to provide instruments for measuring the quality of electric currents and for other analogous purposes which will be more simple and less expensive than those heretofore made, and in which the degrees of the scale shall be equal, or nearly so, for equal increments of current, and which shall also be sensitive and accurate in recording small as well as large changes of current. To this end I have devised a voltmeter or ammeter the chief elements of which are an electro-magnet whose coils are traversed by the current to be measured, with an armature pivoted in proximity to the pole or poles of this magnet, with its pivotal end close to the pole and in a strong magnetic field and its free end adjacent to the same pole, but in a weaker field, so that when the magnet is energized by the flow of the current being tested the armature is magnetized by induction from its pivoted end, and its free end consequently presents a like pole to the pole of the magnet and is repelled. An index-finger is connected to the armature, so as to be moved thereby, and is movable over a graduated scale, so that the strength of the current is indicated by the extent to which the armature is repelled. A prolongation from the magnet-pole extends out under or parallel with the free end of the armature, from which the said end is repelled when the magnet is energized by the current. To prevent the misleading effects of residual magnetism the armature is slotted or bifurcated, and to render the instrument more sensitive it is made astatic, two armatures being attached to the same axis and mounted over the two poles of the magnet.

My invention therefore consists, mainly, in the features above outlined, and also in certain details of construction, including the formation of the switch for putting the instrument in or out of circuit, and in stops or test-points to calibrate or test the instrument for accuracy, and in other minor features, as hereinafter fully set forth and claimed.

In the drawings annexed, Figure 1 is a perspective view of my improved instrument. Fig. 2 is a front elevation, on a larger scale, with the cover or front removed. Fig. 3 is a similar view with the scale-card removed to fully expose the mechanism. Fig. 4 is a vertical section on $x\,x$. Figs. 5, 5½, and 6 illustrate two astatic forms of my invention. Fig. 7 shows an elevation of another form of astatic instrument, and Fig. 8 is a plan of Fig. 7. Fig. 9 shows an elevation of another modification (not astatic) in which the form of the magnet-pole and the armature is the same as in Figs. 7 and 8. Figs. 10, 11, and 12 illustrate other modifications of non-astatic instruments. Fig. 13 shows a modification where the armature is balanced against gravity, but provided with a light spring for retraction or return motion. Fig. 14 shows another modification.

Referring to the drawings, I regard Figs. 5, 6, 7, and 8 as representing or containing the fullest embodiment of my invention, being the astatic forms, and I regard Figs. 1, 2, 3, 4, and 9 as representing the best embodiment of the non-astatic form. In these figures I show the invention both as an ammeter and a voltmeter, as will be hereinafter specifically referred to, the invention being, however, the same in both, as the two kinds of instruments differ only in the size of the coils, the action of the circuit-switch, and the graduation of the scale, as will be readily understood.

I will first describe the single non-astatic form of my invention, (shown in Figs. 1, 2, 3, and 4,) which, as may be noted, is an ammeter. The base of the instrument consists of an upright base-board A, adapted to be fixed to the wall or other support, and from which projects a three-sided housing or casing $a$, which incloses the main parts of the instrument, and within which is centrally arranged an electro-magnet B, which is secured on the base-board in an upright position. Near the lower edge of the base-board are secured the two terminals or binding-posts C C' of the instrument, from which stems or tongues $c\,c'$ extend upwardly on each side of the magnet B. The core $b$ of the magnet B is secured at each end to brass head plates or brackets $d\,d'$, affixed to the base-board, as best shown in Figs. 3 and 4. The core is wound between said pulsion. Furthermore, the new instrument is comparatively simple and inexpensive as compared with others, and it offers practically no resistance to the current, and may hence be left constantly in circuit, if so desired.

Referring to Fig. 2, it will be noted that if the index-finger should become bent or misplaced relatively to the armature the finger would register incorrectly on the scale. To therefore indicate such fault if it exists, and thus test the instrument for accuracy, a test-point (marked T) is formed on the scale at such a distance from the zero that when the armature D is forced down against the stop-pin $m$ the index-finger will then stand at the test-point if the index is accurate, as shown by dotted lines on the left in Fig. 2, thus providing a simple means of verifying the instrument at any time.

It may be observed on reference to Figs. 2, 3, and 4 (see also Figs. 5 and 5½) that the armature D is made most massive at its pivotal end and tapers or diminishes toward the free end, and that the minor or pivoted end is arranged close to the end of the main core of the magnet, where it is in the strongest part of the magnetic field, while the free end is arranged in proximity to the end of the polar prolongation $b'$, where the field of force is much weaker. This is practically important, as it insures that the polarization of the armature will commence from the end which is presented to the strongest part of the magnet-pole, and hence the armature will polarize endwise, the neutral section being in the middle of its length, with a repellent polarity always at its free end over the prolongation $b'$, so that a repelling action is thus always insured. Otherwise, if, for example, the armature was made of uniform mass and arranged throughout its length in a uniform field, it would be likely to polarize uniformly all along the longitudinal or horizontal side presented toward the magnet, the outer side being, of course, of reverse polarity, while the horizontal middle would be the neutral section, so that the armature would be bodily attracted to the magnet instead of being repelled at one end, as I have set forth. The same result would also ensue if the free end of the armature were brought into contact with the magnet-pole or prolongation $b'$ or moved too close thereto, for in such case the free end would be magnetized inductively from the pole or prolongation more strongly than from its opposite end, and would no longer maintain a like polarity to the magnet-pole, but would assume a contrary polarity. To prevent this result, I provide the stop $m$, which arrests the armature before it approaches so close to the pole as to be attracted thereto. The massive end of the armature is preferably of a circular or cylindrical form, as shown in Figs. 2, 3, and 4, and several other figures of the drawings, and the axis of the trunnion-spindle is exactly concentric thereto, so that the mass at the pivoted end will neither approach nor recede from the magnet-pole during all the range of motion of the armature, but remain at the same uniform distance, and thus prevent any inaccuracy in the deflections which would occur if the mass of the armature at the pivoted end should vary in its distance from the magnet.

In use the casing $a$ and the mechanism within the same and the scale-card $o$ are covered by a cap or cover $p$, which fits down over the casing and is hooked to the base-board by hooks $r$, this cap having a segmental glazed opening $p'$ to expose the dial and index $o$ $n$, and through which the readings are observed, as fully shown in Fig. 1.

It will be noted by referring to Figs. 1, 2, 3, and 4 that the posts or terminals C C' are formed with two sockets 2 3, the socket 2 being vertical and provided with binding-screws 5 to receive the circuit-wires, while the sockets 3 are horizontal, or at right angles to the former, and are adapted to receive the switch pins or connections from any branch circuit or from some other instrument, which will prove of great convenience in connecting and disconnecting the instruments and in making various tests.

I have so far described my invention as an ammeter; but it may of course be applied with equal facility as a voltmeter by winding the magnet with a coil of finer wire, graduating the dial to correspond, and altering the construction of the switch. This is illustrated in Fig. 5, which also shows the instrument made astatic. In this case the magnet B is arranged horizontal and is of horseshoe form, the poles projecting beyond the head-bracket $d$ in the form of long tapering cones with a concavely-curved base.

The trunnion-screws $k$ screw directly through slit ears $i$ on the bracket $d$, and the trunnion-shaft is pivoted in said screws and overlies both cores of the magnet just over the concave curve at the base of the conical poles. On this trunnion-shaft are fixed two armatures D D, one over each pole, the rounded massive pivotal ends of the armatures being concentric to the concave curve in the base of the conical poles, as fully shown in Figs. 5 and 5½, by which means the pivotal ends of the armatures will be strongly polarized by the magnet, yet will not vary in their distance from the magnet during their full range of deflection. From the trunnion-shaft projects an index-finger $n$, as before, which moves over a graduated scale $o$, which is of course graduated to represent volts. The magnet-poles are provided with the brass stop-pins $m$, as before, and the scale $o$ has a test-point T, with which the index-finger will register when the armatures are forced up to the stop-pins.

The magnet-coil $e$ is of course of high resistance, and one end connects to the contact-clasps $f$ $f'$, while the other end goes to the terminal C'. The switch $g$ is in contact with the opposite terminal C, and is provided with a spring $j$, which tends constantly to throw the switch against a stop $q$ and thus out of connection with the clasps $ff'$. To put the instrument in circuit, the switch is moved over into the grasp of the clasps $ff'$, and is there held while the reading is being taken. On releasing the switch, the spring $j$ will throw it against the stop $q$, and thus put the instrument out of circuit; hence by this form of switch the instrument cannot be left so long in circuit as to overheat or injure its coils.

The astatic form of the instrument (shown in Fig. 5) may of course also be adapted for ammeters, and should preferably be made astatic for all purposes, because my improved form of instrument is so sensitive and capable of indicating such small currents that I find it is affected by the earth's magnetism when made single or non-astatic.

It will be noted that the armature in my instrument is, in fact, a dipping-needle, and is therefore subject to the influence of the earth's attraction, which will vary at different localities; but by using two armatures with reversed polarities, or making the instrument astatic, as shown in Fig. 5, this influence of the earth will be completely neutralized, and the instrument made perfectly accurate. Where very fine or accurate readings are not necessary, the non-astatic form of the instrument, which is simpler and less expensive, will answer.

It may also be noted by referring to Fig. 5 that the armatures D are slit or bifurcated, which prevents residual magnetism in the armatures, and therefore prevents any error from this cause. The single armature shown in Figs. 2, 3, and 4 is presumed to be slit in the same way, as this feature should be used in both the non-astatic as well as the astatic instruments.

Figs. 6 to 13 illustrate various modifications of my invention, which may be now described.

In Fig. 6 a single magnet-core is used, each end being terminated with curved pole-pieces and polar prolongations $b'$, over which are pivoted two armatures D D with the same effect as in Fig. 5, forming in this case an astatic ammeter. It will be seen that the concave pole-piece $b^2$ partly surrounds the massive cylindrical pivotal end of the armature concentrically with the same effect as that shown in Fig. 5.

In Fig. 9 the instrument is non-astatic, and the polar end of the core is formed with the same concave pole-piece concentric with the pivot of the armature; but the armature is in this case made up of a number of soft-iron wires laid parallel and fixed at one end into the brass trunnion-shaft and at the other end into a brass connecting-bar $m'$, which strikes against the stop-pin $m$ on the polar prolongation $b'$. The divided form of the armature thus prevents residual magnetism with the same effect as, although to a better degree than, the slit form shown in Fig. 5. The ends of the armature-wires protrude from the trunnion-shaft and closely approach the pole-piece $b^2$, which, being concentric to the axis of the armature, gives approximately a uniform polarizing effect at different angular positions of the armature, as before described.

In Figs. 7 and 8 the form of the armature is the same as that in Fig. 9; but the instrument is astatic, with a single-cored magnet. In this case L-shaped pole-pieces are attached to each end of the core, the horizontal limbs of which overlie the core in adjacent parallel lines and are connected across the middle by a transverse brass bridge-piece $s$, which carries the trunnion-screws $k$, in which the trunnion-shaft $l$ is pivoted. The trunnion-shaft is brass, and is provided with armature-wires, as in Fig. 9, but in two sets—one over each pole—which has the concave faces $b^2$ concentric with the axis of the trunnion-shaft, as in Figs. 9 and 6. This I regard as a simple and efficient form of astatic instrument.

Figs. 10, 11, and 12 show other non-astatic forms of instruments, which I, however, regard as less desirable than those preceding.

In Fig. 10 the magnet is horizontal, and the armature D, which is a needle-like strip of iron, hangs vertically pendent and serves directly as the index-finger, the polar end of the core being but slightly changed in form from those already shown.

In Fig. 11 the magnet is vertical and the pole-piece is in the lower end, being formed with a concave face in line with the axis of the core and with the polar prolongation $b'$ extending diagonally downward. The armature D is the same as shown in Figs. 3 and 5, but is provided with a brass counter-balance $u$, to balance the index-finger $n$, which extends diagonally upward in the opposite direction from the armature.

In Fig. 12 the magnet B is in the form of a hollow coil, within which is fixed a core $w$, to one end of which is pivoted the armature D, to which the index-finger $n$ is connected in a radial line. The core and armature are thus pivoted together like two jaws of a pliers, the armature hanging pendent in the zero position shown and being repelled from the core when the coil is charged, as will be understood. The only feature of my invention involved in this modification is the test-point T and stop $m$.

In all the previously-described forms of my invention the armature is balanced by gravity when at the zero position, and gravity is the force which resists the magnetic repulsion of the armature and which returns it to the zero position. By referring to Fig. 13, however, it will be noted that the armature may be balanced by a small brass counter-balance $y$, while a delicate retracting-spring $v$ will act to oppose the magnetic repulsion and to return the armature to zero. I prefer, however, the gravity-armatures, as previously described.

My improved instrument may also be adapted for indicating other qualities of an electric current besides the electro-motive force and quantity, as it may also be adapted to indicate watts, or it may be used to show the force of a magnet by bringing the magnet to be tested in contact or proximity with the magnet of the instrument, as shown in Fig. 14, where B is the magnet to be tested, which is brought into inductive relation with the core $b$ of the instrument.

The pivoting of the armature should preferably be done in all cases with jeweled sockets, the perforated jewels being embedded in the ends of the trunnion-shaft or in the ends of the trunnion-screws, while hardened-steel points extending from the screws or trunnions enter the jewels, both forms being illustrated in the drawings, which is the usual manner of pivoting fine watch, clock, or other instrument work, so as to prevent friction and increase the sensitiveness and accuracy of the instrument, as will be readily understood.

Referring to Figs. 1 and 2, it will be seen that the scale of the instrument includes an angle of about forty-five degrees, although I find that the maximum distance through which the pivotal repellent armature may be made to move by the utmost magnetic force is an angle of about one hundred and twenty degrees. I restrict the scale, however, to about forty-five degrees, as I find that in this range the degrees of the scale are much more uniform, so that equal increments of current more nearly produce equal movements of the armature.

In Fig. 9, which I consider the most sensitive and accurate non-astatic form of my instrument, I prefer to make the core of the magnet of a bundle of fine soft-iron wires, while the polar end or head of the magnet having the curved face $b^2$ and prolongation $b'$ will be formed of cast-iron in one piece, into which the ends of the wires will be fixed, as illustrated in Fig. 9.

It is not absolutely necessary that the repellent armature be mounted directly over or upon the electro-magnet itself, as it may be mounted upon an auxiliary magnet, which is placed in inductive proximity to the electro-magnet energized by the current being tested, as shown in Fig. 14; but this modification I do not recommend, as it is obviously not so effective as the arrangements shown in the other figures.

What I claim as my invention is—

1. In an instrument for the purposes set forth, the combination, with a magnet, of a pivoted repellent armature having both pivoted and free ends in proximity to the same pole of the magnet, but with the pivoted end in a stronger magnetic field than the free end, substantially as set forth.

2. In an instrument for the purposes set forth, the combination, with a magnet, of a pivoted repellent armature having both pivoted and free ends in proximity to the same pole of the magnet, but with the pivoted end in a stronger magnetic field than the free end, and a stop for limiting the movement of the free end of the armature toward the magnet, adapted to prevent the movement thereof so close to the magnet as to cause it to be attracted thereto, substantially as set forth.

3. In an instrument for the purposes set forth, the combination, with a magnet having a polar prolongation or branch of diminished mass extended outside of the most intense field, of a pivoted repellent armature arranged with its pivoted end in proximity to the pole of the magnet and in the concentrated field thereof, and with its free end in proximity to said polar prolongation and in a weaker field, substantially as set forth.

4. In an instrument substantially such as set forth, the combination, with a magnet, of a pivoted repellent armature having both pivoted and free ends in proximity to the same pole of the magnet, but made most massive at the pivoted end and diminished toward the free end, and arranged with its pivoted end in a stronger magnetic field than the free end, whereby repulsion at the free end is insured, substantially as herein set forth.

5. In an instrument substantially such as set forth, the combination, with an electro-magnet, of a repellent armature D, pivoted near the pole thereof, a polar prolongation extending under the free end of the armature, and a non-magnetic stop between the free end of the armature and the prolongation, substantially as shown and described.

6. In an instrument for the purposes set forth, the combination, with a magnet, of a pivoted repellent armature, an index connected to and deriving motion from the armature, a scale traversed by said index and so arranged that when the armature is in equilibrium and is not repelled the index stands at zero, and a stop for limiting the movement of the free end of the armature toward the magnet, arranged to stop the armature at a point between its position of equilibrium and a position in which the free end of the armature would be attracted by the magnet, whereby the armature is movable between its zero position and said stop for test purposes, substantially as set forth.

7. In an instrument for the purposes set forth, the combination, with a magnet, of a pivoted repellent armature, an index connected to and deriving motion from the armature, a scale traversed by said index and so arranged that when the armature is in equilibrium and is not repelled the index stands at zero, and said scale marked with a test-point, such as T, beyond the zero, and a stop for limiting the movement of the free end of the armature toward the magnet, arranged to stop the armature with the index at the test-point, substantially as set forth.

8. In an instrument substantially such as set forth, the combination, with an electro-magnet, of a pivoted repellent armature made in two or more longitudinal bifurcations or divisions, substantially as shown and described.

9. An astatic electro-magnetic testing-instrument consisting of a magnet having two active poles of opposite kinds, with two armatures, both pivoted on the same axis, and arranged, respectively, over the respective poles of the magnet, with the opposite free ends of said armatures adjacent to a portion or prolongation of the same poles, an index extending from said armatures or their axis, and a graduated scale over which the same moves, substantially as and for the purpose set forth.

10. In an instrument such as set forth, the combination, with an electro-magnet, of a pole-piece thereon having a curved concave face and a pivoted repellent armature pivoted concentric to said curve, with its free end adjacent to a portion or prolongation of the same pole, substantially as and for the purpose set forth.

11. In an electric testing-instrument such as set forth, the combination, with the electro-magnet, the pivoted repellent armature, and a stop, such as $m$, of an index-point extending from the armature on its axis and a fixed scale $o$, having a test-point, such as T, beyond the zero of the scale, with which the index registers when the armature is in contact with the stop, substantially as and for the purpose set forth.

JAMES J. WOOD.

Witnesses:
CHAS. M. HIGGINS,
JNO. E. GAVIN.

(No Model.)
C. W. WRIGHT.
SHOVEL OR SPADE.
No. 412,355. Patented Oct. 8, 1889.
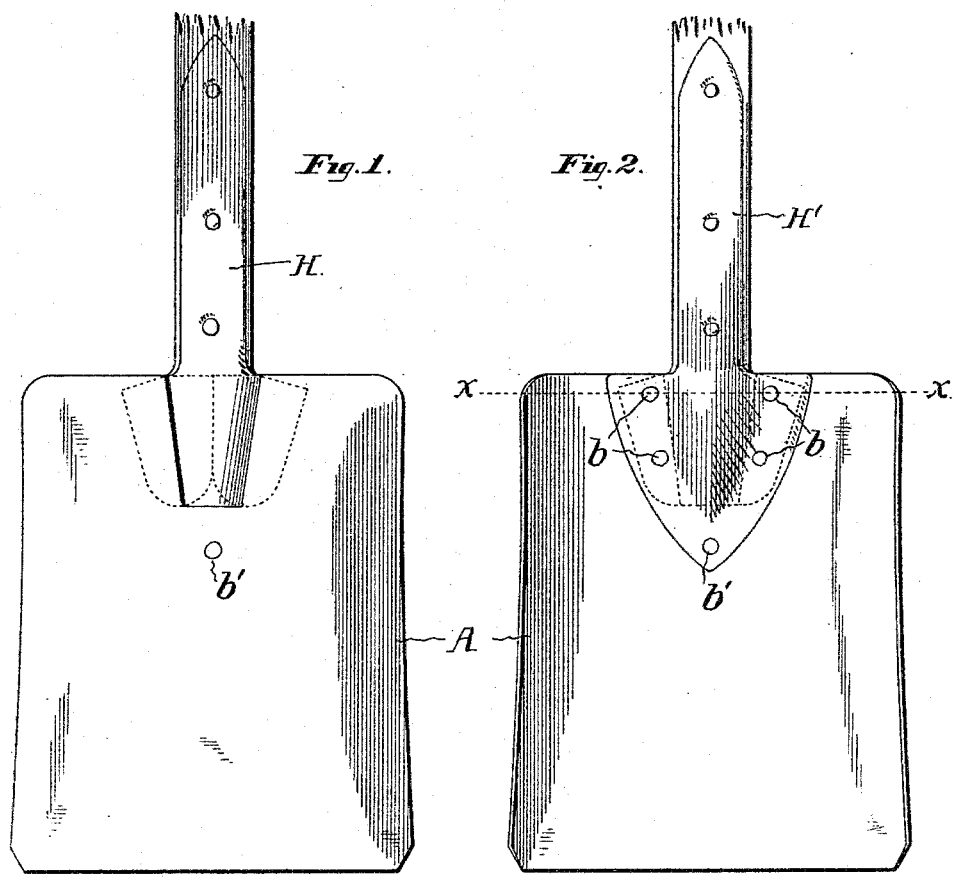
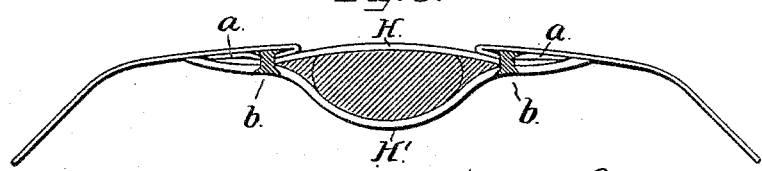
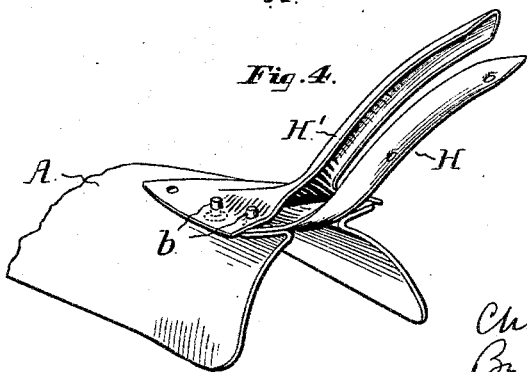
WITNESSES:
INVENTOR
Charles Wesley Wright
By his Attorney,